Feb. 11, 1936.  A. L. HESTON  2,030,749

TIRE BUILDING DRUM

Filed May 15, 1930

INVENTOR
ALLEN L. HESTON
BY
Ely & Barrow
ATTORNEYS

Patented Feb. 11, 1936

2,030,749

UNITED STATES PATENT OFFICE 2,030,749

TIRE BUILDING DRUM

Allen L. Heston, Columbiana, Ohio, assignor to National Rubber Machinery Company, Akron, Ohio, a corporation of Ohio Application May 15, 1930, Serial No. 452,628

8 Claims. (Cl. 154—9)

This invention relates to tire building drums such as are used for building tires by the "flat band" or "pulley band" method.

Heretofore, drums of the above-described type have been provided which are adjustable as to width by the use of filler pieces fitted between the adjustable sections of the drum. These cause considerable delay in adjusting the drum.

The general purpose of the present invention is to provide an improved tire building drum adjustable as to width with a gap shield permanently associated therewith to cover the gap between the adjusted sections and not interfering with the stitching of material onto the drum.

The foregoing and other purposes of the invention are attained in the drum shown in the accompanying drawing and described herein. It is to be understood, however, that the invention is not limited to the specific form thereof shown and described.

Figure 1:
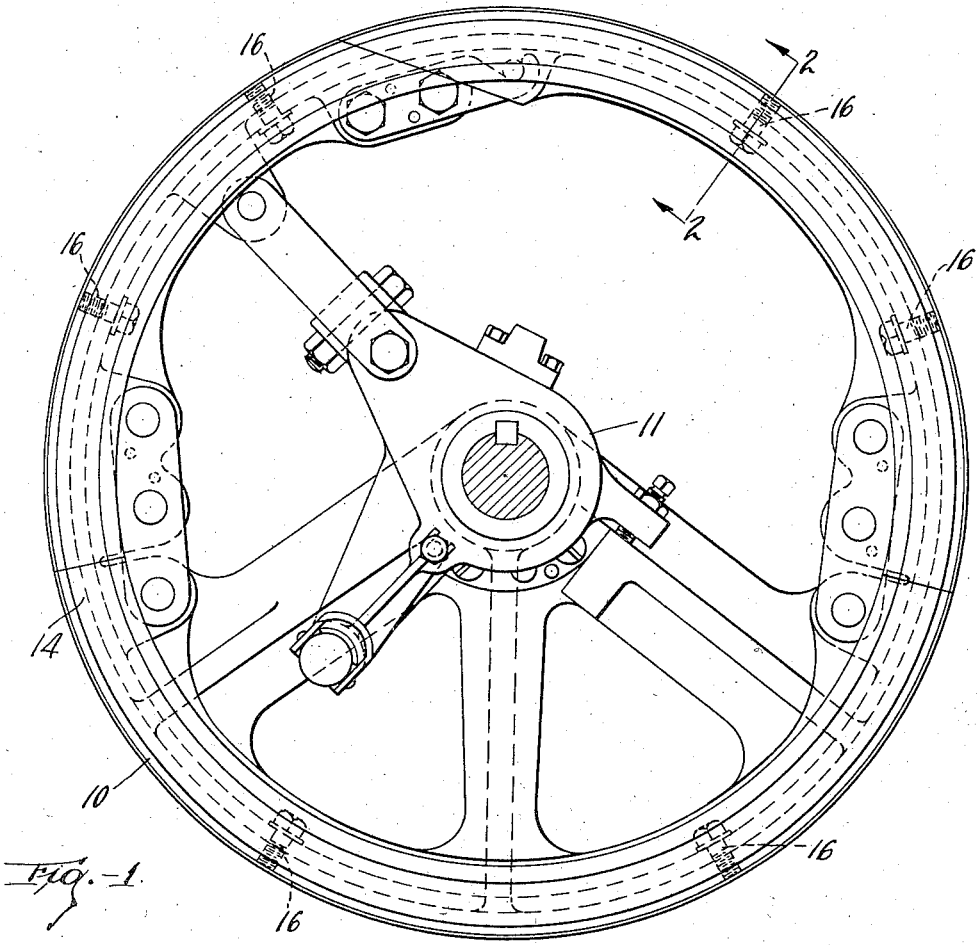
Figure 2:
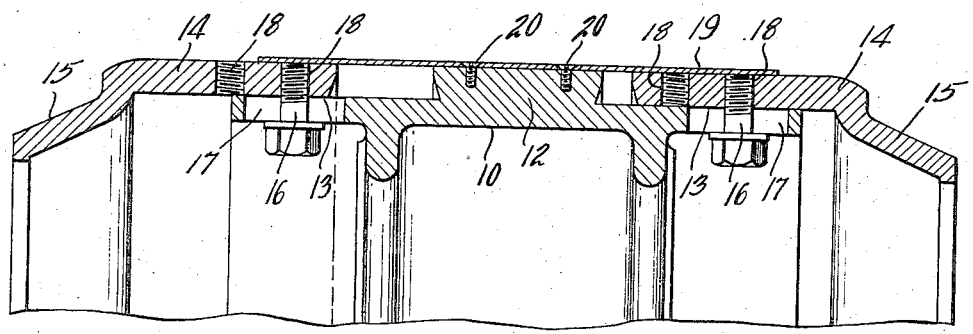

Of the accompanying drawing,

Figure 1 is a side elevation of a tire building drum embodying the invention; and Figure 2 is a section on line 2—2 of Figure 1.

Referring to the drawing, the numeral 10 designates a tire building drum which may be sectional and mounted upon a collapsible chuck 11. As best shown in Figure 2, this drum is adjustable as to width, each section comprising a central member 12, the periphery of which is reduced on each side thereof as at 13, 13 to slidably receive side members or wings 14, 14 which, as disclosed, may be provided with reduced bead receiving seats at 15, 15.

Wings 14 are preferably arranged to be secured in adjusted positions by set screw 16, 16 extending through slots 17, 17 in the central member 12 and threaded into apertures 18, 18 in the wings 14 to tighten the wings in place. A number of apertures 18 may be provided in each wing to increase the range of adjustment.

The gap shield of the invention preferably comprises a sheet of light gauge metal 19 secured by screws or other means as at 20, 20 to the central member 12 and extending over the reduced portions 13 of the central member so as to bear substantially on wings 14 in all positions of adjustment of said wings. This gap shield being thin has no appreciable effect upon stitching of the tire building material onto the drum and as will be apparent the operation of adjusting a drum to width can be accomplished more quickly and effectively, the use of separate gap fillers being avoided.

Modifications of the invention may be resorted to without departing from the spirit thereof or the scope of the appended claims.

What is claimed is:—

1. A collapsible tire building drum comprising sections each including a central member, the periphery of which is reduced at each side thereof, side members formed with reduced bead-receiving seats slidably mounted on the reduced portions of said central member, means for securing said side members in adjusted positions on the central member, and a gap shield of light gauge sheet metal secured to the central member and resting on the side members in all positions of adjustment thereof to cover gaps between the central and side members.

2. A building drum including a central member, the periphery of which is reduced at each side thereof, side members slidably mounted on the reduced portions of said central member, means for securing said side members in adjusted positions on the central member, and a gap shield of light gauge sheet metal secured to the central member and resting on the side members in all positions of adjustment thereof to cover gaps between the central and side members.

3. A building drum including a central member, the periphery of which is reduced at each side thereof, side members slidably mounted on the reduced portions of said central member, means for securing said side members in adjusted positions on the central member, and a thin gap shield secured to the central member and resting on the side members in all positions of adjustment thereof to cover gaps between the central and side members.

4. A collapsible, segmental drum of variable width comprising a rotary support, a series of inner segment members movable thereon to expand and contact the drum, outer segment members mounted on said inner members, intermediate segment members telescopically mounted and axially adjustable between said inner and outer members and forming an axially-continuous drum surface with the outer members, and means for fixing said intermediate members to the inner members at various adjustments.

5. A tire-band forming drum according to claim 4, in which the intermediate segment members are formed with depressed bead seats.

6. A collapsible, segmental, tire-building drum of variable width comprising a rotary support, a series of inner segment members movable thereon to expand and contract the drum, outer segment members mounted on said inner members, intermediate segment members providing bead seating portions and telescopically mounted and axially adjustable between said inner and outer members and forming an axially continuous drum surface with the outer members, and means for fixing said intermediate members to the inner members at various adjustments.

7. A tire band forming drum according to the preceding claim in which the intermediate segment members are formed with depressed bead seats.

8. A tire building drum including a central member, the periphery of which is reduced at each side thereof, side members slidably mounted on the reduced portions of said central member and providing bead seating portions, means for securing said side members in adjusted positions on the central member, and a thin gap shield secured to the central member and resting on the side members in all positions of adjustment thereof to cover gaps between the central and side members.

ALLEN L. HESTON.